(12) United States Patent
Mansour

(10) Patent No.: US 9,008,964 B2
(45) Date of Patent: Apr. 14, 2015

(54) DEVICE FOR ROAD AND URBAN MOBILITY AND FOR SOLVING THE PROBLEM OF TRAFFIC CONGESTION

(71) Applicant: Meed Group, EURL, Paris (FR)

(72) Inventor: Gerard Mansour, Paris (FR)

(73) Assignee: Meed Group, EURL, Paris (FR)

( * ) Notice: Subject to any disclaimer, the term of this patent is extended or adjusted under 35 U.S.C. 154(b) by 0 days.

(21) Appl. No.: 14/461,438

(22) Filed: Aug. 17, 2014

(65) Prior Publication Data

US 2014/0358432 A1 Dec. 4, 2014

Related U.S. Application Data

(63) Continuation of application No. PCT/FR2013/000004, filed on Jan. 7, 2013.

(51) Int. Cl.
*G06F 19/00* (2011.01)
*G01C 21/34* (2006.01)

(52) U.S. Cl.
CPC .................................. *G01C 21/343* (2013.01)

(58) Field of Classification Search
CPC . G08G 1/0104; G08G 1/09; G08G 1/096725; G08G 1/09675; G08G 1/096775; G08G 1/163; G01C 21/26; G05D 1/0212; G05D 1/0289; G05D 2201/0213; G05D 1/0272; G05D 1/0274; B61L 2205/04; B61L 23/34
USPC .......... 701/36, 409, 50, 519; 340/988, 323 R, 340/439, 539.1, 436, 438, 450.2
See application file for complete search history.

(56) References Cited

U.S. PATENT DOCUMENTS

| | | | | |
|---|---|---|---|---|
| 5,867,089 A | * | 2/1999 | Zyburt et al. | 340/323 R |
| 6,094,618 A | * | 7/2000 | Harada | 701/36 |
| 6,127,947 A | * | 10/2000 | Uchida et al. | 340/999 |
| 6,128,559 A | * | 10/2000 | Saitou et al. | 701/23 |
| 6,130,626 A | * | 10/2000 | Kane et al. | 340/905 |
| 6,369,717 B1 | * | 4/2002 | Damiani et al. | 340/815.4 |
| 6,370,452 B1 | * | 4/2002 | Pfister | 701/23 |
| 6,577,246 B1 | * | 6/2003 | Handa et al. | 340/901 |
| 6,697,752 B1 | * | 2/2004 | Korver et al. | 702/116 |
| 6,801,942 B1 | * | 10/2004 | Dietrich et al. | 709/225 |
| 7,046,125 B2 | * | 5/2006 | Fugit | 340/323 R |
| 7,940,165 B1 | * | 5/2011 | Oxley et al. | 340/450.2 |
| 2008/0147306 A1 | * | 6/2008 | Hayashi | 701/117 |
| 2010/0228389 A1 | * | 9/2010 | Hayashi | 700/229 |

* cited by examiner

*Primary Examiner* — Redhwan K Mawari
(74) *Attorney, Agent, or Firm* — Corridor Law Group, P.C.

(57) ABSTRACT

A device for road and urban mobility and for solving the problem of traffic congestion, installed on a vehicle in order to make traffic flow more fluid in and between cities. The device consists of a set of five electronic modules, including a processor. The processor analyzes and extracts positional data of the equipped vehicle from a satellite signal and sends the requests of same for an exchange with a server, bi-directionally. The device is incorporated into an onboard housing. The present device is intended, in particular, to make the traffic flow more fluid and to communicate with a dedicated server in order to guide the driver of the equipped vehicle during his/her journey from a start point to the point entered into the device as the desired final destination. The present device reduces traffic congestion and pollution caused by greenhouse gas emissions.

4 Claims, 2 Drawing Sheets

DEVICE FOR ROAD AND URBAN MOBILITY AND FOR SOLVING THE PROBLEM OF TRAFFIC CONGESTION

CROSS-REFERENCE TO RELATED APPLICATIONS

This application is a continuation of International Application No. PCT/FR2013/000004 having an international filing date of Jan. 7, 2013, entitled "Device For Road And Urban Mobility And For Solving The Problem Of Traffic Congestion". The '004 international application is hereby incorporated by reference herein in its entirety.

FIELD OF THE INVENTION

The present invention relates to a device for road and urban mobility and for solving the problem of traffic congestion.

BACKGROUND OF THE INVENTION

The means and techniques in current operation do not fully utilize the capillarity of a road network and do not anticipate and take actions to ease traffic flow in road networks, both within a city and between cities. Precise and timely information and an accurate view of the traffic flow conditions as they evolve, such as the number and destination of vehicles, are not available to act upon in real time, either from governmental road safety sources or from privately owned computer-based information centers.

To date, traffic flow data has been provided separately for driving in a city and driving in the surrounding areas. Intercity factors affecting traffic flows have not been taken into account in an efficient manner. Moreover, effective bidirectional communication between categories of road users is not presently available. For example, a truck, loaded or not, on a congested road will not be guided or led to a secondary route within a road network without the potential for the secondary route to itself be congested.

Traffic congestion is not presently handled in a holistic or integrated manner due to lack of resources, lack of effective methods, and the exorbitant cost of the technologies available. Conventional techniques for reducing traffic congestion employ Global Positioning Systems (GPS), which involve communication with satellites to guide vehicles. These systems are ubiquitous and available to the general public. However, current GPS devices do not provide an efficient way to monitor and communicate traffic flow conditions in the various branches or routes that make up a road network such that the driver of a vehicle can proceed along the best itinerary in the network. In view of the shortcomings of conventional techniques, the present device anticipates traffic congestion and improves traffic flow.

One of the objectives of the present device is both to reduce the consumption of gasoline by vehicles and to decrease greenhouse gas emissions. The present device also aims to make each trip less dangerous and more predictable. For example, vehicles immobilized or stopped on the road by traffic officers are often the cause of traffic congestion that develops along a roadway. The present device and its associated navigation system, once deployed in sufficient numbers, automatically anticipate and reduce the development of traffic congestion. Due to the bidirectional means of communication implemented in the present device, vehicle drivers can avoid traffic congestion by complying with and adhering to directions to follow suggested routes toward their ultimate destinations.

The present device provides effective means to overcome the hazards and inconvenience of traffic congestion. The device includes a set of five electronic modules, one of which is a processor connected to two interfaces. An interface (MRX) converts the signal received continuously from a satellite by a receiver (RX). The other interface (MTRX) is simultaneously connected to a transmitter/receiver and to the processor. The processor analyzes and extracts position data (longitude and latitude) and transmits the resulting data. The transmitter/receiver (TRX) exchanges information with a remote server in bidirectional mode. The device is integrated into a unit carried on-board vehicles that subscribe to a service for improving vehicle mobility and traffic flow. The service operates under a dedicated remote server that is capable of communicating with the present device.

Another characteristic of the present device is the interactivity between its navigational aid system and the remote server, which provides the following capabilities:

(a) Reception from a satellite of signals relating to vehicle location.
(b) Calculation of the position coordinates of the vehicle out of the signal by the processor.
(c) Calculation of the vehicle speed, the remaining distance and the time duration to reaching the next node of section by the processor.
(d) Transmission of a query to a remote server.
(e) Updating a digital database by the remote server.
(f) Calculation of an updated itinerary for the vehicle by the remote server.
(g) Transmission of the updated itinerary to the device by the remote server.
(h) Displaying of the updated itinerary to the driver of the vehicle.
(i) Queries sent to the remote server include vehicle speed, the remaining distance and the time duration to reaching the next node of a section.
(j) Transmission of queries at a time immediately after carrying out processor analysis of the three parameters mentioned above: speed, distance and time.
(k) One of the following events triggers a transmission of a query at an appropriate time instant: reaching a relevant proximity of the next node of a section, slowing down for a significant period of time, stopping, and starting again after a stop.
(l) The duration is not the same between two queries (variable frequency, asynchronous transmission) for the updates.
(m) Each query is taken into account for a global optimization of traffic flow.
(n) The itinerary is recalculated by the remote server to disperse equipped and participating vehicles over the capillarity of the road network.
(o) For equipped and participating vehicles, the itinerary is updated in real time based upon the traffic flow conditions raised by the received parameters of speed, distance and time.
(p) Vocal announcements to the driver allow him/her to pursue an updated itinerary and to arrive faster at his/her destination with minimal traffic congestion.

SUMMARY OF THE INVENTION

An improved device reduces traffic congestion. The device is carried on-board a vehicle to guide the driver of the vehicle from a current position to a final destination. The device is capable of real-time communication to update in Machine-to-Machine (M2M) mode a digital database stored on a remote server. The device is capable of generating a query by processing a satellite signal. The query comprises the variables of:

(a) distance (DRj) remaining to reaching a relevant proximity of the next node of section (j);
(b) time duration (TRj) to reaching a relevant proximity of the next node of section (j);
(c) speed (Vij) at time instant (i) where the vehicle is at a distance (DRj) of the next node of section (j); and
(d) time instant (i) for sending a query is determined by the Event occurring when reaching a relevant proximity of the next node of section (j), or significant slowing or stopping or starting again after a stop.

The device comprises a satellite receiver, a terrestrial transmitter/receiver and a micro-electronic circuit having an embedded operating algorithm capable of carrying out the following steps:

(i) identifying the driver, securing permission and entry of journey and destination data for navigational aid during the journey;
(ii) periodically processing the satellite signal relative to the position of the vehicle to determine the time instant (i) of the query;
(iii) calculating DRj, TRj and Vij;
(iv) transmitting DRj, TRj and Vij to update the digital database at the time instant (i) coinciding with the vehicle having at least one of a predetermined proximity to the next node of section (DRij), a slowdown longer than a predetermined threshold, a stoppage and a restart again after a stoppage;
(v) storing in memory files comprising at least one of images, text and vocal messages;
(vi) verifying and controlling updates generated by the remote server to enable the device to execute files stored in memory;
(vii) executing files stored in memory upon receipt of an order from the server or initiation during vehicle motion by the device algorithm;
(viii) displaying a section of an updated itinerary when an update is received from the server;
(ix) actuating a vocal message and section display of the updated itinerary upon instruction as response to a query or initiated by the device algorithm;
(x) displaying of the updated itinerary during absence of the satellite signal.

In one embodiment of the device, position coordinates of latitude and longitude are solely interpretable by the device algorithm and each transmission to update the digital database of the remote server consists solely of the variables DRj, TRj and Vij.

In another embodiment of the device, the transmission of a query to update the digital database is made at a time instant coinciding with one of: the vehicle reaching a predetermined proximity of the next node of section (j), slowing for a period greater than a predetermined threshold, stopping, and restarting after a stop.

In another embodiment of the device, exchange of data with the remote server is asynchronous such that between two queries transmission, the elapsed time varies among digital database updates.

DETAILED DESCRIPTION OF PREFERRED EMBODIMENT(S)

Figure 1:
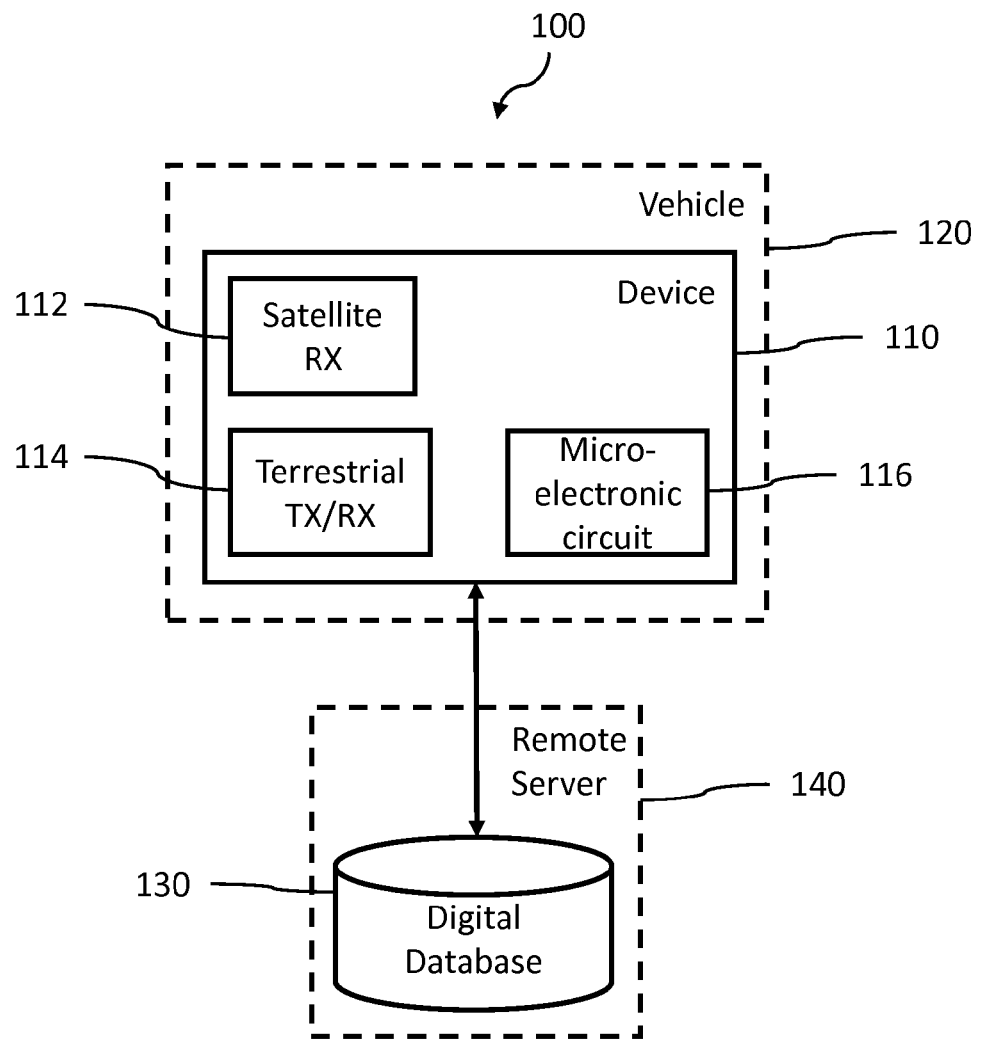
FIG. 1 is a block diagram illustrating an embodiment of the present system for reducing traffic congestion.

In the present application, a node is a bifurcation, crossroad or junction. A section is the path that connects two nodes. An itinerary consists of a series, namely, a succession of sections. Capillarity of a road network consists of the possible routes or itineraries linking a departure point to an arrival point by a combination of roads, streets, avenues, boulevards, arterials and/or highways.

The present device is integrated into a unit, container, box or housing, and is made up of five interconnected modules:
(I) Satellite receiver (RX) for positional data.
(II) Input adaptive Interface to Processor (MRX).
(III) Processor configuration: Central Unit, Central Memory and Exchange Unit.
(IV) Transmitter/Receiver (TRX).
(V) Transmission adaptive Interface (MTRX) between the processor and the Transmitter/Receiver.

The present device receives real-time correlated information from a satellite. For conformity, MTX converts and directs the information to the processor to analyze and extract the position coordinates. The processor calculates in real time three parameters on a periodic basis, namely: speed (Vij), Remaining Distance (DRj) and Time Duration (TRj) to reaching a relevant proximity to the next node of a section. These three variables constitute each query. The program, and its processor algorithm, does not systematically transmit queries, but in some cases, it determines the appropriate time instant (tj) to update a remote server located in a center, dedicated to the observation and the management of the traffic flow for the equipped vehicles, and real time operated (twenty-four hours a day and seven days a week). Thus, at time instant (tj), the algorithm triggers a transmission to notify by query about: reaching a particular proximity of the next node of a section, a significant slowing, stopping, or starting again after a stop. Upon receiving these queries, the remote server updates its digital database, reassesses the overall condition of traffic flow in the various branches of or routes that make up the road network, and then responds. The response may be an update of the travel itinerary and an instruction that the processor stores in its memory and presents to the user the following instruction: display of one single section and a vocal announcement to be complied with and followed. Successive displays of sections and vocal announcements, one after the other, automatically guide the user to reach his/her destination. The objective is to optimize or improve traffic flow within a city (boulevards, avenues, streets), as well as arteries and highways between cities, provided that the device becomes adopted by an operationally significant number of drivers.

The present device is capable of:
(A) Sending a query of connection to the remote server when starting the vehicle.
(B) Allowing the user to be identified and, after connection to the service, to enter the user's destination.
(C) Operating automatically to maintain data exchange through TRX.

The processor, in a preferred configuration, can:
(1) Extract from the satellite signal the position coordinates.
(2) Calculate in real time the query (Vij, DRj, and TRj) continuously and periodically.

(3) Determine, when necessary, the appropriate time instant (tj) and transmit a query.
(4) Execute in real-time received instructions in response to its query.
(5) Accept updates and updated files.
(6) Store in memory vocal message files and launch, upon receipt of an instruction, its associated file.
(7) Refresh the displayed image of a section of road.
(8) Keep available the updated itinerary so it can be used during an absence of a satellite signal.
(9) Maintain and continue the navigational aid service in the absence of a satellite signal.

The present device automatically operates Machine-to-Machine (M2M) and verifies the traffic flow fluidity prior to committing in any section of the capillarity of the road network so that the user arrives at his/her destination in reduced or minimal time, while reducing gasoline consumption and greenhouse gas emissions.

When necessary, the program (processor algorithm) updates by query. The processor analyzes the captured/calculated data (Vij, DRj, TRj) before determining the appropriate time instant (tj) to sending a query about vehicle status: reaching a relevant proximity of next node of section, or slowing down for a significant period, or stopping, or starting again after a stop.

Vocal messages files stored in memory can be updated by the device. The device preferably displays the image of one and only one section of the itinerary on which the vehicle is proceeding.

The device transmitter/receiver communicates when and as needed, resulting in consumption savings of radio or wireless signal bandwidth in both directions. Bandwidth savings enable a substantial number of users to be satisfied with the responsiveness of the service to which they have subscribed.

FIG. 1 illustrates an embodiment of system 100 for reducing traffic congestion. System 100 comprises device 110 carried on-board vehicle 120. Device 110 communicates in real-time to update digital database 130 stored on remote server 140. Device 110 comprises satellite receiver (RX) 112, terrestrial transmitter/receiver (TX/RX) 114 and micro-electronic circuit 116.

Figure 2:
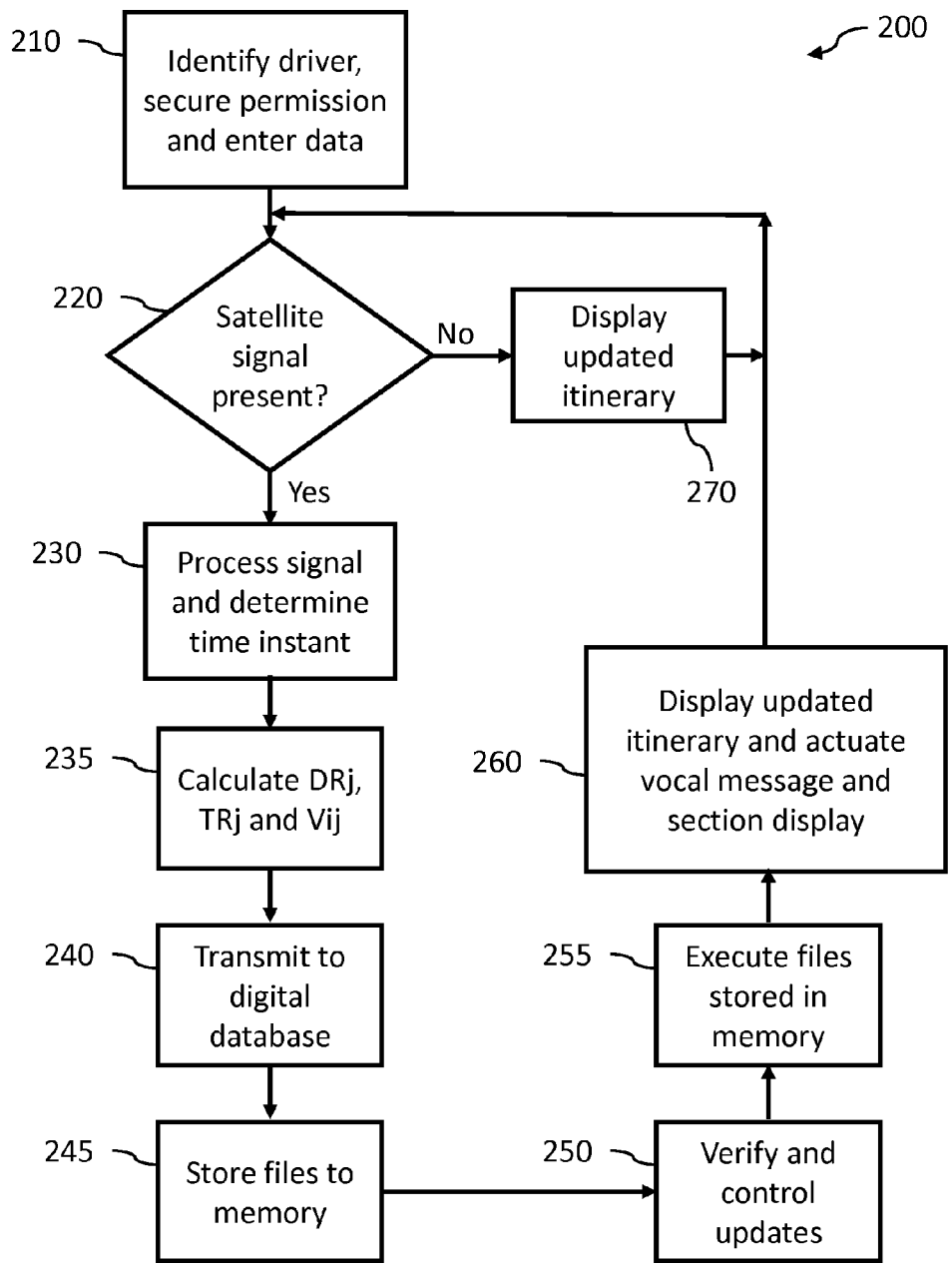
FIG. 2 is a flowchart illustrating a representative method of operating the communication device of the system illustrating in FIG. 1

FIG. 2 illustrates a representative method 200 of operating communication device 110 of FIG. 1. At 210, method 200 identifies the driver of vehicle 120 of FIG. 1, secures permission, and enters journey and destination data for navigational aid during the journey. At 220, method 200 determines presence of a satellite signal. If the satellite signal is present, method 200 proceeds to 230 and periodically processes the satellite signal relative to the position of the vehicle to determine the time instant (i) of a query. At 235, method calculates DRj, TRj and Vij. At 240, method 200 transmits DRj, TRj and Vij to update digital database 130 of FIG. 1 at the time instant (i) coinciding with the vehicle having at least one of a predetermined proximity to the next node of section (DRij), a slowdown longer than a predetermined threshold, a stoppage and a restart again after a stoppage. At 245, method 200 stores files in memory, the files comprising at least one of images, text and vocal messages. At 250, method 200 verifies and controls updates generated by the remote server to enable the device to execute files stored in memory. At 255, method 200 executes files stored in memory upon receipt of an order from the remote server or initiation during vehicle motion by the device. At 260, method 200 displays a section of an updated itinerary when an update is received from the remote server, and actuates a vocal message and section display of the updated itinerary upon instruction as response to a query or initiated by the device. If the satellite signal is absent at 220, method 200 proceeds to 270 and displays the updated itinerary.

The navigational aid system enables the on-board device to be synchronized with the remote server to manage and make the traffic flow in the road network capillarity more fluid according to the following steps:
  (i) Reception from a satellite of a signal relating to the position of vehicle by the on-board device that includes a processor.
  (ii) Calculation of the positional coordinates of the vehicle from the signal received by the processor.
  (iii) Calculation of the vehicle speed, the remaining distance and the time duration to reaching the next node of section.
  (iv) Transmission of a query to a remote server by the device.
  (v) Update of a digital database processed by the remote server.
  (vi) Calculation in real time and updating of the itinerary for the vehicle by the remote server.
  (vii) Transmission in real time of updated itinerary by the remote server.
  (viii) Displaying in real time to the driver the updated itinerary for the vehicle.

The present device is particularly suited to communicating with a remote server dedicated to alleviating traffic congestion.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A device for reducing traffic congestion, the device carried on-board a vehicle to guide the driver of the vehicle from a current position to a final destination, the device capable of real-time communication to update in Machine-to-Machine (M2M) mode a digital database stored on a remote server and capable of generating a query, said query generated by processing a satellite signal and comprising the variables of:
  (a) distance (DRj) remaining to reaching a relevant proximity of the next node of section (j);
  (b) time duration (TRj) to reaching a predetermined proximity of the next node of section (j);
  (c) speed (Vij) at time instant (i) where the vehicle is at a distance (DRj) of the next node of section (j); and
  (d) time instant (i) for sending a query is determined by the Event occurring when reaching a relevant proximity of the next node of section (j), or significant slowing or stopping or starting again after a stop;
  said device comprising a satellite receiver, a terrestrial transmitter/receiver and a micro-electronic circuit having an embedded operating algorithm capable of carrying out the following steps:
  (i) identifying said driver, securing permission and entry of journey and destination data for navigational aid during the journey;
  (ii) periodically processing said satellite signal relative to the position of said vehicle to determine the time instant (i) of the query;
  (iii) calculating DRj, TRj and Vij;
  (iv) transmitting DRj, TRj and Vij to update said digital database at the time instant (i) coinciding with said vehicle having at least one of a predetermined proximity to the next node of section (DRij), a slowdown longer than a predetermined threshold, a stoppage and a restart again after a stoppage;
(v) storing in memory files comprising at least one of images, text and vocal messages;
(vi) verifying and controlling updates generated by said remote server to enable said device to execute files stored in memory;
(vii) executing files stored in memory upon receipt of an order from said server or initiation during vehicle motion by said device algorithm;
(viii) displaying a section of an updated itinerary when an update is received from said server;
(viii) actuating a vocal message and section display of said updated itinerary upon instruction as response to a query or initiated by said device algorithm;
(ix) displaying of the updated itinerary during absence of said satellite signal.

2. The device of claim 1, wherein position coordinates of latitude and longitude are solely interpretable by said device algorithm and each transmission to update said digital database of said remote server consists solely of said variables $DR_j$, $TR_j$ and $V_{ij}$.

3. The device of claim 1, wherein the transmission of a query to update said digital database is made at a time instant coinciding with one of: said vehicle reaching a predetermined proximity of the next node of section (j), slowing for a period greater than a predetermined threshold, stopping, and restarting after a stop.

4. The device of claim 1, wherein exchange of data with said remote server is asynchronous such that between two queries transmission, the elapsed time varies among digital database updates.

* * * * *